United States Patent [19]

Namakura et al.

[11] Patent Number: 5,215,341
[45] Date of Patent: Jun. 1, 1993

[54] STRUCTURAL MEMBER MOLDED OF RESIN HAVING A METAL RING INSERT AND METHOD OF PRODUCING THE SAME

[75] Inventors: Toshio Namakura; Yoshimi Soeda; Kozo Miyazaki; Motokazu Nemoto, all of Kanagawa, Japan

[73] Assignee: Ebara Corporation, Tokyo, Japan

[21] Appl. No.: 696,432

[22] Filed: May 6, 1991

[30] Foreign Application Priority Data

May 10, 1990 [JP] Japan ............................ 2-122127

[51] Int. Cl.⁵ .................. F16B 37/14; F16L 47/00
[52] U.S. Cl. ............................ 285/423; 285/923; 264/254; 264/274; 411/903
[58] Field of Search ............... 285/423, 331, 923; 264/250, 254, 255, 274, 310, 318, 275; 411/901, 902, 903, 82, 180

[56] References Cited

U.S. PATENT DOCUMENTS

| | | | |
|---|---|---|---|
| 2,705,816 | 4/1955 | Sampson | 264/254 |
| 2,908,941 | 10/1959 | Sabo et al. | |
| 2,940,128 | 6/1960 | Bowerman et al. | 264/254 |
| 2,948,051 | 8/1960 | Eisler | 264/254 |
| 3,016,578 | 1/1962 | Rohf | 264/274 |
| 3,247,550 | 4/1966 | Haines | 264/775 |
| 3,484,516 | 12/1969 | Simons | |
| 3,571,857 | 3/1971 | Rhyne | |
| 4,481,160 | 11/1984 | Bree | 264/254 |
| 4,815,920 | 3/1989 | Morooka | 411/377 |
| 4,988,472 | 1/1991 | Orimoto et al. | 264/274 |

FOREIGN PATENT DOCUMENTS

| | | |
|---|---|---|
| 3844295 | 5/1990 | Fed. Rep. of Germany . |
| 58-119619 | 7/1983 | Japan . |
| 64-30720 | 2/1989 | Japan . |
| 2-309000 | 12/1990 | Japan . |
| 2078892 | 1/1982 | United Kingdom .......... 411/903 |

OTHER PUBLICATIONS

Nagai, "Jituyo Purasuchikku Yogo Jiten (Practical Plastic Term Dictionary)" 3rd edition, 1989, p. 48, insert metal, insert molding, p. 393, double-shot molding.
Shiraishi, "Shashutu Seikeiyo Kanagata (Metal Mold for Injection Molding)", 4th edition, 1971, p. 22, 2.1.11 Insert.

Primary Examiner—Eric K. Nicholson
Attorney, Agent, or Firm—Armstrong, Westerman, Hattori, McLeland & Naughton

[57] ABSTRACT

A structural member comprising a main body molded of synthetic resin, an insert portion molded from a engineering plastic having better functional properties at least in respect of strength than those of an ordinary synthetic resin and a metallic reinforcement ring entirely embedded in the structural member between the main body and the insert portion is disclosed. The foremost end part of another member is threadly engaged with a plurality of female threads around the inner surface of the insert portion or press fitted into the insert portion. A method of producing a structural member of the foregoing type is practiced by employing an injection molding process by way of a first step of placing a metallic reinforcement ring in a first molding die for forming an insert portion and then injecting a engineering plastic in the first molding die and a second step of placing an assemble of the insert portion and the reinforcement ring in a second molding die for forming a main body of the structural member and then injecting a synthetic resin in the second die.

27 Claims, 3 Drawing Sheets

STRUCTURAL MEMBER MOLDED OF RESIN HAVING A METAL RING INSERT AND METHOD OF PRODUCING THE SAME

BACKGROUND OF THE INVENTION

1. Field of the Invention

The present invention relates to a structural member molded from a synthetic resin wherein the structural member is connected to another member by threadable engagement or press fitting.

Further, the present invention relates to a method of producing a structural member of the foregoing type by employing an injection molding process.

2. Description of the Related Art

As is well known, a variety of products molded from a synthetic resin have meritorious advantages in that such products have a light weight, excellent anti-erosion properties, can be easily colored and decorated and can be mass-produced efficiently and inexpensively. Therefore, products molded of a synthetic resin have been hitherto extensively used.

In addition, not only an ordinary synthetic resin but also engineering plastics are used as industrial materials for motorcars, televisions, refrigerators and other products.

In recent years, research and development work has been conducted for providing by fully utilizing modern blending technology, a new polymerized material and plastic material having excellent properties.

However, as far as industrial machines are concerned, these plastic materials have limited practical application because various properties and a high rigidity are required when they are employed as an industrial material.

For example, in a case where the foregoing kind of plastic materials are employed for pumps, products molded of a plastic material have been heretofore produced using the same plastic material by employing an injection molding process. However, the plastic material has a tensile strength lower than that of an incorporated metallic material by a figure. Additionally, the plastic material has an elastic modulus lower than that of the metallic material by two figures. Further, the strength of the plastic material is readily reduced under the influence of welds and irregular distribution of a filler during a molding operation.

To connect a pump to a pipe line, the pump must include a part which serves to connect a joint or a plug to a main body of the pump. However, in view of the low strength of the plastic material as mentioned above, this part should not be constructed such that a high intensity of stress locally appears when tapered male threads are threadably fitted to the part or a tube is press fitted into the part. Instead, the part should be constructed such that it is sealed in a liquid tight manner by using a sheet packing or an O-ring on the end surface thereof. Alternatively, the part can be constructed such that a metallic insert is used for the part. With the exception of a case where standard threads of which the pitch is dimensioned to be smaller than M8 (which denotes a metric coarse screw thread having a 1.25 mm pitch) are employed for the metallic insert, fabrication of this metallic insert is expensive when it is designed to have a special configuration or is designed to be of a large dimension as in the case of an insert bush, tapered threads for a pipe line or the like. Accordingly, another problem is that the metallic insert is made additionally expensive by requiring to be corrosion resistant.

Consequently, as long as the conventional method of designing and molding products using a plastic material in the above-described manner is employed for industrial machines, application of the products molded of the plastic material cannot be enlarged due to many restrictive conditions derived from the undesirable properties of the plastic material.

SUMMARY OF THE INVENTION

The present invention has been made with the foregoing background in mind.

An object of the present invention is to provide a structural member molded of a synthetic resin and including a threadable fitting portion or an insert portion for allowing another member to be securely connected to the structural member to be fitted or inserted thereinto wherein a strength of the threadable fitting portion or the insert portion is largely increased by improving a structure of the threadable fitting portion or the insert portion.

Another object of the present invention is to provide a method of producing a structural member of the aforementioned type wherein the structural member can be produced with commercial efficiency at a light weight.

To accomplish the former object, the present invention provides a structure member molded of a synthetic resin and including a threadable fitting portion for allowing a plurality of tapered male threads at the foremost end part of another member to be securely connected to the structural member to be threadably engaged with the threadable fitting portion or an insert portion for allowing the foremost end part of another member to be securely connected to the structural member to be press fitted into the insert portion, wherein the threadable fitting portion either including or not including a plurality of female threads formed around the inner peripheral surface thereof is molded from engineering a plastic in a cylindrical configuration, the plastic having excellent functional properties and having a strength which is far greater than that of an ordinary synthetic resin; a metallic reinforcement ring is fitted around the outer peripheral surface of the threadable fitting portion or the insert portion; and a main part of the structural member is molded to be integral with the threadable fitting portion or the insert portion using an ordinary synthetic resin to build a required outer configuration of the structural member such that the metallic reinforcement ring is fully embedded in the structural member between the main body and the threadable fitting portion or the insert portion while being entirely isolated from the atmosphere.

To ensure that the metallic reinforcement ring is immovably fitted between the main body and the threadable fitting portion, it is preferable that a plurality of projections and recesses are alternately formed around the outer peripheral surface of the threadable fitting portion or the insert portion at least in the region exclusive of the metallic reinforcement ring while extending in the radial direction.

Further, to accomplish the latter object, the present invention provides a method of producing a structural member by employing an injection molding process, wherein the method is practiced by way of a first step of placing a metallic reinforcement ring at a predetermined position in a first molding die for molding a threadable fitting portion for allowing the foremost end part of another member to be threadably engaged with a plurality of female threads around the inner peripheral surface of the threadable fitting portion or an insert portion for allowing the foremost end part of another member to be press fitted into the inner peripheral surface of the insert portion and thereafter injecting engineering plastics having better functional properties than those of an ordinary synthetic resin and a second step of placing an assembly of the threadable fitting portion or the insert portion and the metallic reinforcement ring at a predetermined position in a second molding die for molding a main part of the structural member and thereafter injecting an ordinary synthetic resin into the second die to build a required outer configuration of the structural member such that the metallic reinforcement member is fully embedded in the structural member between the main body and the threadable fitting portion of the insert portion.

According to the present invention, since the threadable fitting portion or the insert portion of the structural member is molded of a plastic having excellent functional properties particularly in respect of strength and moreover the metallic reinforcement ring is securely fitted around the outer peripheral surface of the threadable fitting portion or the insert portion, the strength of the threadable fitting portion or the insert portion can be increased substantially.

Since the remaining part of the structural member exclusive of the threadable fitting portion or the insert portion is molded of an ordinary synthetic resin, production of the structural member is inexpensive.

In addition, since the complete structural member is molded by an injection molding process, production of the structural member is also highly efficient.

The metallic reinforcement ring is immovably arranged between the threadable fitting portion and the main part of the structural member while it is entirely isolated from the atmosphere. Therefore, there is no possibility of the metallic reinforcement ring being corroded.

Another objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 1b is a sectional view of the upper casing taken along line A—A in FIG. 1a;

FIG. 2b is a sectional view of the threadable fitting portion taken along line B—B in FIG. 2a.

DETAILED DESCRIPTION OF THE PREFERRED EMBODIMENTS

Now, the present invention will be described in detail hereinafter with reference to the accompanying drawings which illustrate a preferred embodiment of the present invention.

Figure 3:
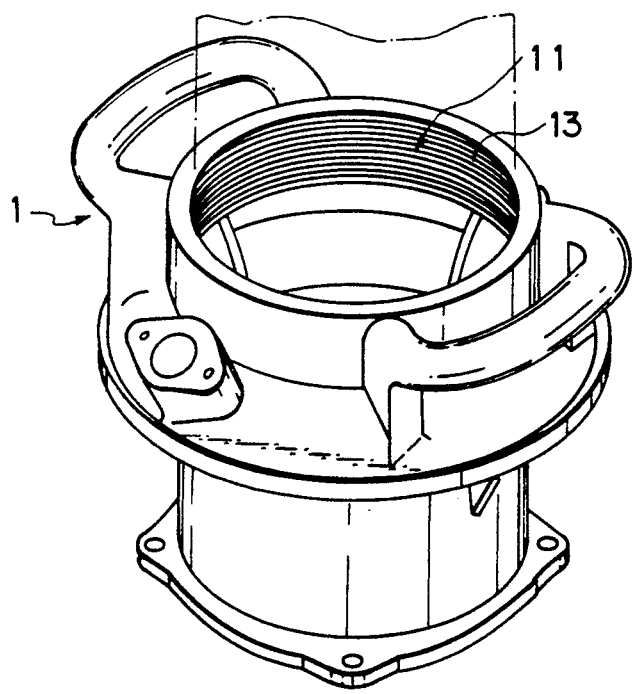
FIG. 3 is a perspective view of the upper casing for an underwater pump.

FIG. 3 is a perspective view which illustrates by way of example a structural member molded of a synthetic resin in accordance with the embodiment of the present invention wherein the structural member is molded in the form of an upper casing 1 for an underwater pump which includes a female threaded portion (having a plurality of female threads each having a large inner diameter).

As shown in the drawing, the upper casing 1 is provided with a threadable fitting portion 13 around the inner peripheral surface of a discharge port 11, and the threadable fitting portion 13 has a plurality of parallel female threads formed around the inner peripheral surface thereof wherein these female threads are preferably employable for a pipe line and have an inner diameter of 4 or 5 inches, respectively.

As represented by one-dot chain lines in the drawing, a socket or a fitting flange including a plurality of male tapered threads is threadably fitted into the threadable fitting portion 13 so that the upper casing 1 is practically used for pumping or draining water through a hose or a pipe line (not shown).

Figure 1A:
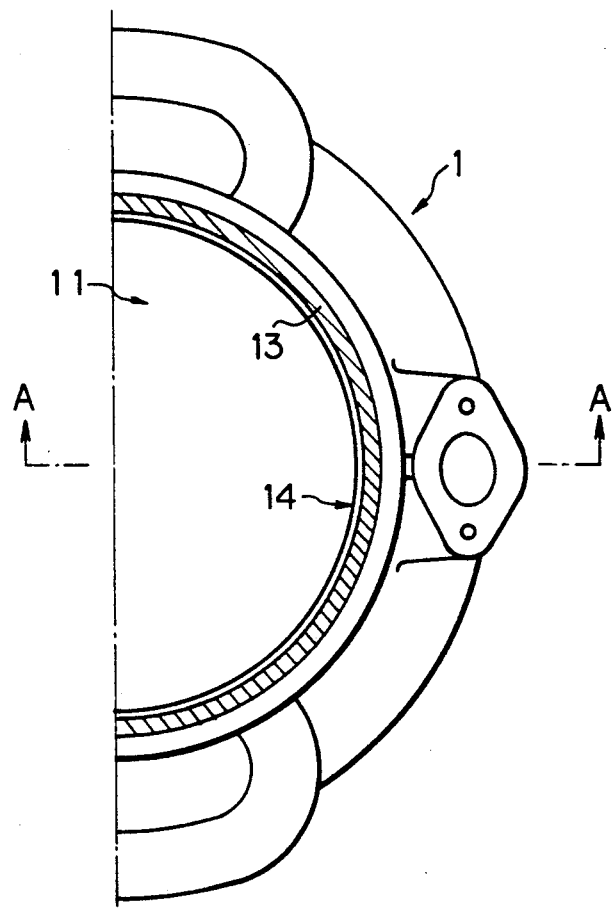
FIG. 1a is a plan view of an upper casing for an underwater pump wherein the upper casing is molded in accordance with an embodiment of the present invention.
Figure 1B:
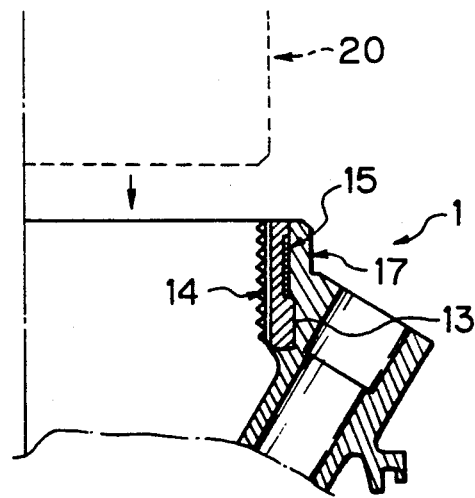

FIG. 1a is a plan view of the upper casing 1 (showing a half of the upper casing 1) and FIG. 1b is a sectional view of the upper casing 1 taken along line A—A in FIG. 1a.

As shown in the drawings, the discharge port 11 of the upper casing 1 is constructed in the cylindrical configuration and has a triple-layered structure comprising a threadable fitting portion 13 having a plurality of female threads formed around the inner peripheral surface thereof, a metallic reinforcement ring 15 fitted around the outer peripheral surface of the threadable fitting portion 13 and a main body 17 of the upper casing 1 integrally molded with the metallic reinforcement ring 15.

Next, the respective components constituting the upper casing 1 will be described below.

The threadable fitting portion 13 is molded of a plastic having far better functional properties than those of an ordinary synthetic resin employed for the main body 17 in respect of strength, slidability, wear resistance and dimensional accuracy. In this embodiment, a 66 nylon is employed as engineering plastics in consideration of a solution usable for the upper casing 1 such that the 66 nylon having a number of short cut glass fibers mixed therewith for the purpose of reinforcement is molded by employing an injection molding process. It has been found that injection molded products each produced using a 66 nylon having a number of short cut glass fibers mixed therewith for reinforcement have excellent functional properties in respect of moldability, dimensional accuracy, mechanical characteristics, wear resistance against repeated mounting/dismounting of a socket or the like and slidability. It should be noted that the present invention should not be limited only to the 66 nylon but plastics other than the 66 nylon may be employed depending on the use to which the upper casing 1 is to be put.

The threadable fitting portion 13 is constructed to have a substantially cylindrical configuration, and a plurality of female threads 14 are formed around the inner peripheral surface of the threadable fitting portion 13. It should be noted that the female threads 14 are molded at the same time when the threadable fitting portion 13 is molded by employing an injection molding process. Accordingly, no machining operation is required after completion of the molding operation for the female threads 14.

The metallic reinforcement ring 15 is constructed using a band-shaped thin steel plate which is bent to exhibit an annular shape. As is best seen in FIG. 2b, the metallic reinforcement ring 15 is fitted around the outer peripheral surface of the threadable fitting portion 13. The metallic reinforcement ring 15 can easily be made by performing a press working operation or a welding operation for the band-shaped steel plate.

The metallic reinforcement ring 15 is fitted around the threadable fitting portion 13 to reinforce it so as to prevent it from being broken or deformed when a socket or a fitting flange is fitted therein.

The main body 17 is molded to be integral with the upper casing 1 using the same synthetic resin as that for the upper casing 1. According to the embodiment of the present invention, a polyolefin-based synthetic resin preferably employable for practicing a reactive injection molding process is used because it has excellent properties in respect of moldability and shock resistance.

Figure 2A:
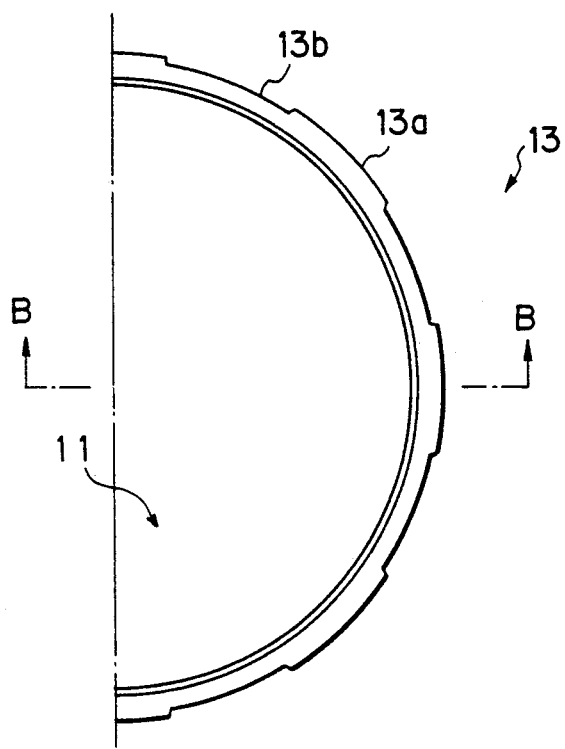
FIG. 2a is a plan view of a threadable fitting portion which has a metallic reinforcement ring integrally fitted around the outer peripheral surface of the threadable fitting portion.
Figure 2B:
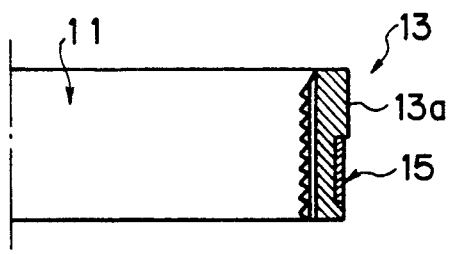

FIG. 2a is a plan view of the threadable fitting portion 13 having the metallic reinforcement ring 15 fitted therearound as seen from the lower side in FIG. 1b (showing a half of the threadable fitting portion 13) and FIG. 2b is a sectional view of the threadable fitting portion 13 taken along line B—B in FIG. 2a.

As shown in FIG. 2a and FIG. 2b, a plurality of projections 13a and a plurality of recesses 13b are alternately arranged in the region below the metallic reinforcement ring 15 fitted around the outer peripheral surface of the threadable fitting portion 13 [in the region above the metallic reinforcement ring 15 as seen in FIG. 2b] while extending in the radial direction. Arrangement of the projections 13a and the recesses 13b assures that the threadable fitting portion 13 is firmly engaged with the main body 17 when the former is molded to be integral with the latter. Therefore, with such an arrangement, there does not arise a malfunction whereby the threadable fitting portion 13 is rotated together with a socket or a fitting flange, slidably displaced in the axial direction or disengaged from the main body 17 when the socket or the fitting flange is fitted into the threadable fitting portion 13.

Next, a method of producing the upper casing 1 will be described below.

First, the metallic reinforcement ring 15 is placed at a predetermined position in a first molding die for molding the cylindrical threadable fitting portion 13 shown in FIG. 2 by employing an injection molding process. Thereafter, the foregoing kind of engineering plastics is injected into the first molding die.

On completion of the injection molding operation, the threadable fitting portion 13 is formed with a plurality of female threads 14 while the metallic reinforcement ring 15 is integrally fitted around the outer peripheral surface of the threadable fitting portion 13.

Next, the threadable fitting portion 13 and the metallic reinforcement ring 15 are placed at a predetermined position in a second molding die for molding the main part 17 shown in FIG. 1 by employing an injection molding process. Thereafter, an ordinary synthetic resin is injected into the second molding die.

On completion of the injection molding operation, the whole upper casing 1 is formed to be integral with the threadable fitting portion 13.

It should be noted that as shown in FIG. 1b, since the upper casing 1 is molded while the metallic reinforcement ring 15 is entirely isolated from the outside in the presence of the threadable fitting portion 13 and the main body 17, there is no possible that the metallic reinforcement ring 15 is corroded by the environmental atmosphere.

In a case where the main body 17 is complicated in shape or has large dimensions, it is desirable to employ the reactive injection molding process as mentioned above which can be practiced with a low intensity of injection pressure. However, the present invention should not be limited only to this. Alternatively, another molding process may be employed, provided that it is proven that it can be employed with the same advantageous effects as those of the reactive injection molding process.

After the molding operation for the whole upper casing 1 is completed, e.g., a socket 20 [represented by a dotted line in FIG. 1b] including a plurality of male threads is threadably fitted into the threadable fitting portion 13. Since the threadable fitting portion 13 is molded from a plastic having excellent functional properties and moreover the metallic reinforcement ring 15 is fitted around the outer peripheral surface of the threadable fitting portion 13, there is no possibility that the threadable fitting portion 13 may be broken or deformed undesirably.

The present invention has been described above with respect to a case where the present invention is applied to an upper casing 1 of a pump including a threadable fitting portion 13. Alternatively, the present invention may be applied to other kinds of structural members with the same advantageous effects as those of the upper casing 1.

According to the embodiment of the present invention, the threadable fitting portion 13 is formed with a plurality of female threads 14 around the inner peripheral surface thereof. Alternatively, the inner peripheral surface of the threadable fitting portion 13 may serve as a press-fitting portion for another member to be firmly connected to the upper casing 1 without any necessity for the formation of female threads.

Consequently, the present invention can be applied to any structural member molded of a synthetic resin and including an insert portion for another member to be firmly connected to the structural member, e.g., a socket, a fitting flange or the like wherein the foremost end part of the member is inserted into the insert portion so as to be securing connected to the structural member.

As is apparent from the above description, a structural member molded of a synthetic resin according to the present invention offers the following advantages.

(1) Since the insert portion of a structural member for allowing another member to be inserted thereinto (corresponding to the threadable fitting portion 13 in the shown embodiment) is molded of engineering plastics having excellent functional properties particularly in respect of a strength much more than those of an ordinary synthetic resin and the outer periphery of the insert portion is reinforced with a metallic reinforcement ring, the strength of the insert portion can be increased substantially. Thus, there is no possibility that breakage or deformation of the insert portion.

(2) Since the residual part of the structural member other than the insert portion is molded of an ordinary synthetic resin, the structural member can be produced inexpensively.

(3) Since the structural member including an insert portion is molded by employing an injection molding process, it can be produced to have a light weight. In addition, since a machining operation to be performed after completion of the injection molding operation is minimized, the structural member can automatically be produced within a short period of time with the possibility of it being able to be colored without the necessity for a separate painting operation.

(4) Since the metallic reinforcement ring is fully embedded in the structural member while it is entirely isolated from the outside in the presence of the insert portion (the threadable fitting portion 13) and the main part of the structural member (main part 17 of the upper casing 1), there is no possibility of the metallic reinforcement ring being corroded.

While the present invention has been described above with respect to a single preferred embodiment thereof, it should of course be understood that the present invention should not be limited only to this but various changes or modifications may be made without departure from the scope of the invention as defined by the appended claims.

What is claimed is:

1. A structural member comprising:
   an insert portion for allowing the foremost end part of another member to be fitted thereinto, wherein said insert portion comprises a threaded fitting portion having a plurality of female threads for threadably engaging with a plurality of tapered male threads at said foremost end part of said another member, and wherein said insert portion comprises a molded engineering plastic and is substantially in the form of a cylinder;
   a metallic reinforcement ring fitted around the outer peripheral surface of said insert portion; and
   a main part molded integral with said insert portion from a synthetic resin other than an engineering plastic, said main part forming an outer configuration of the structural member such that said metallic reinforcement ring is fully embedded within the structural member, and wherein said engineering plastic has a higher strength than said synthetic resin.

2. The structural member as claimed in claim 1, wherein a plurality of projections and a plurality of recesses are alternately formed around an outer peripheral surface of the insert portion, at least a portion of said projections being formed in a region where the metallic reinforcement ring is not overlaid.

3. The structural member of claim 1, wherein the diameter of said insert portion is approximately 4 to 5 inches.

4. The structural member of claim 1, wherein said engineering plastic comprises nylon.

5. The structural member of claim 4, wherein said nylon is 66 nylon.

6. The structural member of claim 4, wherein said engineering plastic further comprises a plurality of reinforcing short cut glass fibers.

7. The structural member of claim 1, wherein said metallic reinforcement ring surrounds only said plurality of female threads of said threaded fitting portion.

8. The structural member of claim 1, wherein said synthetic resin is a polyolefin-based synthetic resin.

9. A method of producing a structural member, comprising the steps of:
   placing a metallic reinforcement ring at a predetermined position in a first molding die for molding an insert portion for allowing the foremost end part of another member to be inserted therein;
   injecting engineering plastic into said first molding die to mold said insert portion integral with said metallic reinforcement ring;
   placing said molded insert portion integral with the metallic reinforcement ring at a predetermined position in a second molding die for molding a main part of the structural member; and
   injecting a synthetic resin other than an engineering plastic into said second molding die to form an outer configuration of the structural member such that the metallic reinforcement ring is entirely embedded within the structural member between said main body and said insert portion, wherein said engineering plastic has a higher strength than said synthetic resin, and wherein said insert portion comprises a threaded fitting portion having a plurality of female threads for threadably engaging with a plurality of tapered male threads at said foremost end part of said another member.

10. The method of claim 9, wherein the diameter of said insert portion is approximately 4 to 5 inches.

11. The method of claim 9, wherein said engineering plastic comprises nylon.

12. The method of claim 11, wherein said nylon is 66 nylon.

13. The method of claim 11, wherein said engineering plastic further comprises a plurality of reinforcing short cut glass fibers.

14. The method of claim 9, wherein said metallic reinforcement ring surrounds only said plurality of female threads of said threaded fitting portion.

15. The method of claim 9, wherein said synthetic resin is a polyolefin synthetic resin.

16. A structural member comprising:
   an insert portion for allowing the foremost end part of another member to be fitted thereinto, wherein said insert portion comprises a press insert portion for allowing said foremost end part of said another member to be press fitted within said insert portion, and wherein said insert portion comprises a molded engineering plastic and is substantially in the form of a cylinder;
   a metallic reinforcement ring fitted around the outer peripheral surface of said insert portion; and
   a main part molded integral with said insert portion from a synthetic resin other than an engineering plastic, said main part forming an outer configuration of the structural member such that said metallic reinforcement ring is fully embedded within the structural member, and wherein said engineering plastic has a higher strength than said synthetic resin.

17. The structural member of claim 16, wherein the diameter of said insert portion is approximately 4 to 5 inches.

18. The structural member of claim 16, wherein said engineering plastic comprises nylon.

19. The structural member of claim 18, wherein said nylon is 66 nylon.

20. The structural member of claim 18, wherein said engineering plastic further comprises a plurality of reinforcing short cut glass fibers.

21. The structural member of claim 16, wherein said synthetic resin is a polyolefin-based synthetic resin.

22. A method of producing a structural member, comprising the steps of:
- placing a metallic reinforcement ring at a predetermined position in a first molding die for molding an insert portion for allowing the foremost end part of another member to be inserted therein;
- injecting engineering plastic into said first molding die to mold said insert portion integral with said metallic reinforcement ring;
- placing said molded insert portion integral with the metallic reinforcement ring at a predetermined position in a second molding die for molding a main part of the structural member; and
- injecting a synthetic resin other than an engineering plastic into said second molding die to form an outer configuration of the structural member such that the metallic reinforcement ring is entirely embedded within the structural member between said main body and said insert portion, wherein said engineering plastic has a higher strength than said synthetic resin, and wherein said insert portion comprises a press insert portion for allowing said foremost end part of said another member to be press fitted within said insert portion.

23. The method of claim 22, wherein the diameter of said insert portion is approximately 4 to 5 inches.

24. The method of claim 22, wherein said engineering plastic comprises nylon.

25. The method of claim 24, wherein said nylon is 66 nylon.

26. The method of claim 24, wherein said engineering plastic further comprises a plurality of reinforcing short cut glass fibers.

27. The method of claim 22, wherein said synthetic resin is a polyolefin synthetic resin.

* * * * *

UNITED STATES PATENT AND TRADEMARK OFFICE
CERTIFICATE OF CORRECTION

PATENT NO. : 5,215,341
DATED : June 1, 1993
INVENTOR(S) : Toshio NAKAMURA et al.

It is certified that error appears in the above-identified patent and that said Letters Patent is hereby corrected as shown below:

On cover page, item [75] and item [19], first inventor's name is misspelled: "Namakura" should be --Nakamura--.

Signed and Sealed this

Twenty-fourth Day of May, 1994

Attest:

BRUCE LEHMAN

Attesting Officer     Commissioner of Patents and Trademarks